Figure 1:
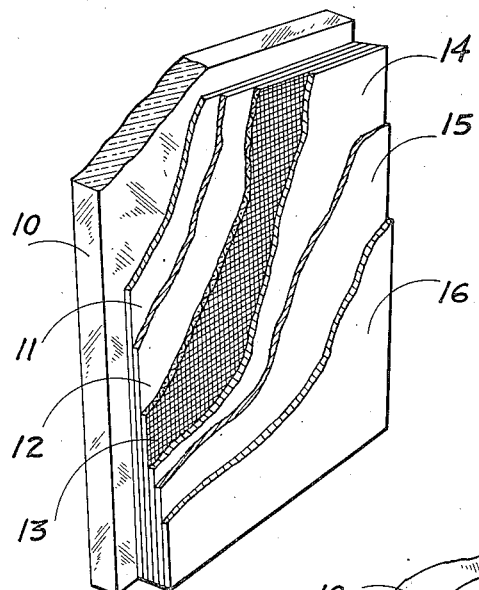

April 2, 1946.    T. S. REESE    2,397,623
TRANSFER
Filed June 2, 1942

INVENTOR.
Thomas S. Reese
BY
Bosworth & Sessions
ATTORNEYS.

Patented Apr. 2, 1946

2,397,623

UNITED STATES PATENT OFFICE 2,397,623

TRANSFER

Thomas S. Reese, University Heights, Ohio, assignor to The Di-Noc Company, Cleveland, Ohio, a corporation of Ohio Application June 2, 1942, Serial No. 445,475

8 Claims. (Cl. 41—33)

This invention relates to the decoration of surfaces. The invention is described herein as it may be embodied in transfers designed for application to glass to render it opaque, particularly for blackout purposes, but it is to be understood that the invention is useful for other purposes and in other fields.

Obviously, blackout materials for application to glass must be opaque, and should be of low cost and ready application. In addition, in blackout materials, as well as in surface covering materials for various other purposes it is desirable to provide a dark or neutral surface which will not reflect very much visible light, and which, preferably, will not glare or shine in the light. For example, a very desirable exterior appearance is presented by olive drab paint having a flat or matte finish. Another desired characteristic is that the material should reflect a considerable percentage of the heat rays falling upon it. Ordinary materials, such as flat olive drab paint, which are desirable from the standpoint of the reflection of visible light, are particularly undesirable from the standpoint of absorption of heat. The result is that the sun shining on a surface covered with such a paint will result in undue heating of the underlying material. Thus the heat of the sun on windows blacked out by ordinary paints of dark colors has frequently resulted in breakage. On the other hand, an ordinary paint which will reflect heat to a sufficient extent to prevent breakage of the windows will also reflect visible light to an undesirable extent.

It is an object of my present invention to provide a material which will meet both of these requirements, that is, a material which will reflect a considerable percentage of the heat rays, for example, sufficiently to prevent undue heating of a window to which it is applied, and which at the same time will absorb and diffuse visible light rays and thus will present a dull or dark appearance and will not shine or glare. Other objects are to provide materials which are easy to apply and economical to produce, and which, when applied to a window will present a pleasing interior appearance. Another object is to provide a blackout material which will lessen the splintering of glass to which it is applied. Further objects and advantages of my invention will become apparent from the following description of the preferred forms thereof, reference being made to the accompanying drawing. The essential characteristics are summarized in the claims.

Briefly, according to a preferred form of my invention as applied to blacking out of windows, I attain the above noted and other objects by applying to the glass, either to the exterior or interior, depending upon specific requirements, a film of lacquer, or other similar materials such as synthetic resins and the like, consisting preferably of the following layers: (1) An inner opaque layer adapted to prevent transmission of light through the glass. (2) A layer of a reflective material adapted to reflect the heat rays striking the exterior of the window. This may comprise any light reflecting material, such as a white lacquer, but I preferably employ a layer consisting of aluminum or copper paint or varnish, that is, a layer consisting of aluminum or copper powder carried in a suitable vehicle such as lacquer. Obviously this layer, while effective in preventing the transmission of heat through the window will also reflect visible light to such an extent that it would be quite unsuitable for blackout purposes. (3) To cut down the reflection of the visible light and the glare from the reflective layer, while at the same time preserving its heat insulating or reflecting characteristics to a considerable extent, I apply to the surface of the reflective layer, a layer of material which will scatter, diffuse or absorb the visible light falling on the surface to such an extent that the surface will present a flat, dark or neutral appearance while at the same time a considerable percentage of the invisible infra-red rays falling on the layer will be reflected rather than absorbed. Preferably, I accomplish this by printing on the reflective layer in an ink of a suitable preferably dark color such as olive drab, and with a printing plate arranged to deposit the ink in a minute pattern on the surface of the aluminum, leaving the reflective layer bare in the areas between the inked portions. For example, this may be accomplished by a rotogravure plate or a half-tone plate. The result is that a considerable percentage of the area of the reflective layer remains bright and uncovered by pigment, so that much of the heat falling on the layer will be reflected, but the effect of the ink is such that the visible light impinging upon the surface is scattered, diffused and absorbed to a sufficient extent to prevent the aluminum from glaring or shining, and substantially to destroy any specular reflection from the reflective layer. The film is preferably applied as a transfer so that it can be produced economically and applied readily.

In addition to the layers noted above, the film may also contain a layer of pigmented lacquer or the like which is of a color selected to present a light and pleasing appearance to persons inside of the building. Also protective layers of clear lacquer may be employed particularly in films intended for application to the exterior of windows. The films may be secured to the windows by suitable adhesive materials such as ordinary water soluble gums. A water solution of equal parts of hide glue and glycerine is very satisfactory for this purpose.

Figure 2:
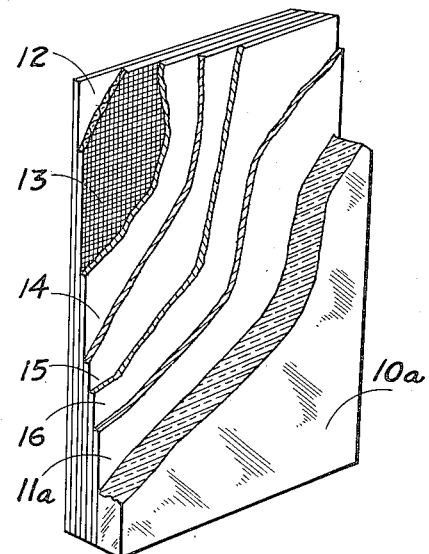
Figure 3:
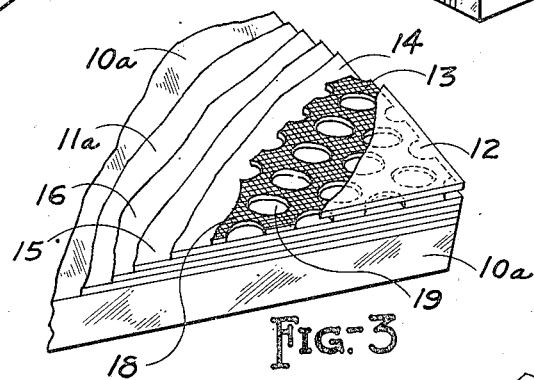
Figure 4:
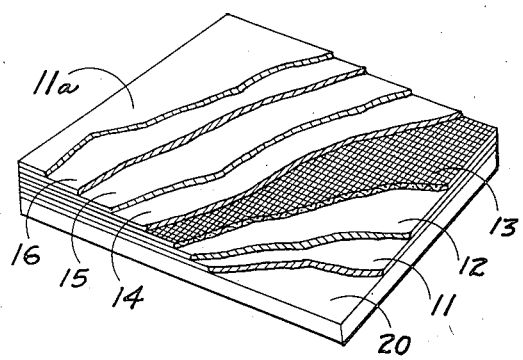
Figure 5:
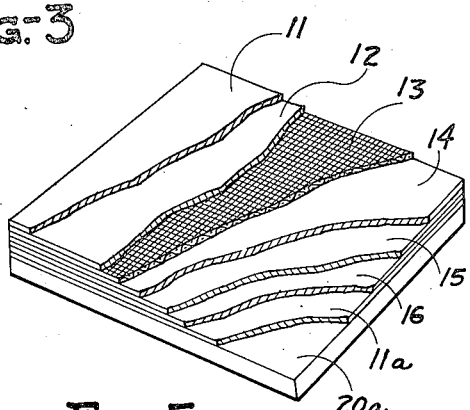

Referring to the drawing which is necessarily somewhat diagrammatic and in which portions are broken away to show the several layers, Figure 1 illustrates a piece of glass having a film made according to my invention applied to the interior surface thereof; Figure 2 illustrates a film made of the same type applied to the exterior surface of a glass window; Figure 3 is a detail on a greatly enlarged scale of a portion of the film and window of Figure 2; Figure 4 illustrates one form of transfer made according to my invention and adapted for applying the films to windows, and Figure 5 illustrates a modified form of transfer.

As shown in Figure 1 my material may be applied to the interior surface of a pane of glass 10 and when so applied preferably comprises an adhesive layer 11 for securing the film to the glass, a clear protective coat 12 which functions to protect and strengthen the screen or diffusing layer 13, the reflective or insulating layer 14, then an opaque preferably black layer 15 which prevents transmission of light through the film, and finally the color layer 16 which may be of any desired color selected from the standpoint of the interior appearance of the building. The screen layer 13 is preferably printed in a neutral ink of dark color such as olive drab, while the reflective or insulating layer 14 is preferably composed of aluminum or copper powder in a suitable vehicle although other reflective materials such as various white pigments may be employed.

In Figure 2 a film of essentially the same character is shown as applied to the exterior surface of a pane of glass 10a. Here the film includes the clear protective layer 12 which is exposed to the exterior atmosphere, the screen layer 13, the reflective layer 14, the opaque layer 15 and the color layer 16 all arranged as before. However, in this modification the adhesive layer 11a is adjacent the color layer to secure the film to the window whereas in the form shown in Figure 1 the adhesive layer is adjacent the clear protective coating.

The film of Figure 2 is illustrated in an enlarged scale in Figure 3 to show the nature of the screen layer 13. This preferably comprises pigmented areas 18 with openings or spaces 19 through which the underlying reflective layer may be seen. This sort of pattern may be produced by a half-tone gravure plate. Other types of plates may be employed such as ordinary halftone plates or the usual gravure plates. Screens of about 60 lines per inch may be employed with good results, but the invention is not limited to the use of screens of any particular mesh or type. The proportion of pigmented and unpigmented areas can be varied, it being desirable to employ as little pigment as possible while providing sufficient pigment to prevent undue reflection of light. The proportions depend on the nature of the materials employed and the proper proportions and areas for different materials can be determined by experiment. I preferably apply only sufficient pigment to eliminate the glare of the reflective layer, and to give a dull or flat appearance approaching the appearance of a continuous film of the selected pigment. The areas meeting this requirement can be determined by visual inspection. The arrangement shown in the drawing is suitable when the pigment is a flat olive drab of the type at present recommended by the United States Army.

Films of the character described can readily be manufactured and applied to windows in the form of transfers. A transfer of one type suitable for such purpose is shown in Figure 4 wherein the film is built up on a backing sheet 20 having the adhesive layer 11 thereon. The adhesive layer is then coated with the clear, protective layer 12, the screen layer 13, the reflective layer 14, the opaque layer 15, the color layer 16, and the adhesive layer 11a. This type of transfer can be applied to the exterior of the glass to produce the arrangement shown in Figures 2 and 3. The transfer is applied to the glass in the usual manner, the adhesive layer 11a holding the transferred film to the glass while the adhesive layer 11 is softened by water so that the backing sheet may be stripped off.

Transfers of this same construction may also be applied to the inside of windows to produce the arrangement shown in Figure 1, the transfer then being used as a "slide off" transfer. To apply the film in this manner the transfer is wetted as before which softens the adhesive 11 so that the film may be slid off the backing sheet 20 and onto the window, the adhesive layer 11 functioning to secure the film to the window with the clear protective layer 12 adjacent the inner surface of the window. When the transfer is to be used as a "slide off" the adhesive layer 11a would be omitted. Various other of the layers can be omitted for varying purposes, it only being necessary to provide the reflective layer and the screen layer together with some means for mounting the film, and to insure that the film is opaque if the transfer is to be used for blackout purposes. Where the principal object is to cut down glare and reflection of visible light the film need not be opaque, indeed for some purposes, such as the elimination of glare from metal or other bright surfaces, or surfaces which have been painted with aluminum or other reflective paints, only the screen layer is necessary, although it is preferable to include a clear protective layer also.

In Figure 5 of the drawing I have illustrated another form of transfer adapted to produce the arrangement shown in Figures 1 and 2. Here the same coatings are provided on the backing sheet 20a but the order of the coatings is reversed. The adhesive layer 11a is first applied to the paper, then the color layer 16, is followed by the opaque layer 15, the reflective layer 14, the screen layer 13, the clear protective coating 12 and the adhesive layer 11 in that order. This type of transfer is designed to be applied to the inner surface of a window in the ordinary manner in which case the film will be secured to the window by the adhesive 11, the adhesive layer 11a being softened by water so that the backing sheet 20a can be stripped off. When this transfer is applied to the exterior of a window, it is used as a "slide off," the adhesive layer 11a functioning to release the film from the backing sheet 20a and also to secure the film to the exterior of the window. When the transfer is designed for use on the exterior of a window, the adhesive layer 11 will be omitted and as before various of the other layers can be omitted depending upon the requirements of the particular job.

For some purposes it is essential that the blackout windows present as dull and flat an appearance as possible. For such services the transfer should be applied to the exterior of the windows and preferably the outer protective layer should have a flat or matte surface. In transfers such as those shown in Figure 4, this flat or matte surface can be obtained by controlling the surface of the adhesive 11 on which the film is built up, thus to provide a flat, dull surface. The adhesive may consist of merely a coating of starch having the granular characteristics of starch. This will give a corresponding granular character to the surface of the protective film 12 when the backing sheet 20 is stripped away from it, thus providing a dull, flat, lusterless matte surface. This method of obtaining a matte surface is described in greater detail and claimed in my application Serial No. 445,476 filed of even date herewith.

When a "slide off" transfer is applied to the exterior of a window the flatness can be obtained by incorporating so-called flattening agents in the layer 12. However, I prefer to employ the ordinary type of transfer and secure the flatness by controlling the adhesive, for the flattening agents ordinarily employed have the effect of weakening the film and impairing its transparency.

From the foregoing description of the preferred form of my invention it will be seen that I have provided blackout materials for application to glass in which the glass is not only rendered opaque, but reflections of visible light are substantially reduced and undue absorption of heat from the sun is prevented. When my materials are applied to the exterior of the glass, reflections and glare are eliminated. Both types of transfers described herein can be economically produced and easily and rapidly applied to windows. Because of the strength of the lacquer films preferably employed and the strong adhesion of the films to the glass, shattering of the glass is lessened and the splintering of the glass into small fragments is greatly reduced. While the invention is described herein with particular reference to blacking out of windows, it will be obvious that it may be useful for other purposes, for example, in the decoration of any surface where it is desired to give the surface a dull finish of dark or neutral color, and at the same time to prevent undue absorption of heat by the surface.

Various changes and modifications in my invention may be made without departing from the spirit and scope thereof. It is accordingly to be understood that my patent is not limited to the preferred forms described herein or in any manner other than by the scope of the appended claims.

I claim:

1. An opaque film adapted to be applied to a window comprising an inner pigmented layer adapted to be visible from inside the window, an opaque layer, a reflective layer composed of a material adapted to reflect visible light and infra-red rays, a screen layer adapted to diffuse and absorb visible light to cut down the reflection of visible light from said reflective layer without preventing said reflective layer from reflecting a substantial portion of the infra-red rays impinging thereon, and a clear protective layer overlying said screen layer.

2. An opaque film adapted to be applied to a window comprising an opaque layer, a reflective layer composed of a material adapted to reflect visible light and infra-red rays, a screen layer adapted to diffuse and absorb visible light to cut down the reflection of visble light from said reflective layer without preventing said reflective layer from reflecting a substantial portion of the infra-red rays impinging thereon, and a clear protective layer overlying said screen layer.

3. An opaque film adapted to be applied to a window comprising an opaque layer, a reflective layer composed of a material adapted to reflect visible light and infra-red rays, and a screen layer adapted to diffuse and absorb visible light to cut down the reflection of visible light from said reflective layer without preventing said reflective layer from reflecting a substantial portion of the infra-red rays impinging thereon.

4. An opaque film adapted to be applied to the exterior of a window comprising an adhesive for securing the film to the window, an inner pigmented layer, an opaque layer, a reflective layer composed of a material adapted to reflect visible light and infra-red rays, a screen layer adapted to diffuse and absorb visible light to prevent glare from said reflective layer without preventing said reflective layer from reflecting a substantial portion of the infra-red rays impinging thereon, and a clear protective outer layer having a matte finish overlying said screen layer.

5. An opaque sheet or film adapted to be applied to the exterior of a window comprising a reflective layer composed of a material adapted to reflect visible light and infra-red rays, and having a screen pattern printed thereon in a dark, flat pigment, said screen pattern being adapted to diffuse and absorb visible light to prevent glare from said reflective layer without preventing said reflective layer from reflecting a substantial portion of the infra-red rays impinging thereon.

6. In a transfer comprising a backing sheet having a film detachably secured thereto, the improvement of a film comprising a reflective layer, a screen layer composed of a flat, dark colored pigment printed in a screen pattern to leave a substantial portion of the area of said reflective layer uncovered, while eliminating glare and greatly reducing the reflection of visible light from said reflective layer, and a clear protective layer having a matte finish overlying said screen layer.

7. In a transfer comprising a backing sheet having a film detachably secured thereto, the improvement of a film comprising a color layer, an opaque layer, a reflective layer and a screen layer composed of a flat, dark colored pigment printed in a screen pattern to leave a substantial portion of the area of said reflective layer uncovered, while eliminating glare and greatly reducing the reflection of visible light from said reflective layer.

8. A transfer film adapted to be initially supported by a backing sheet and then applied to an exterior surface, said film comprising a pigmented layer adapted to be disposed next to the surface, a reflective layer containing a metallic pigment overlying said pigmented layer, a screen layer overlying said reflective layer and composed of a flat pigment printed on said reflective layer in a screen pattern, and a clear protective layer overlying said screen layer, said protective layer having a matte surface.

THOMAS S. REESE.